United States Patent [19]

Drori

[11] 4,312,374
[45] Jan. 26, 1982

[54] DIFFERENTIAL-PRESSURE VALVE

[76] Inventor: Mordeki Drori, 89 Zahal St., Kiron, Israel

[21] Appl. No.: 114,894

[22] Filed: Jan. 24, 1980

[30] Foreign Application Priority Data

Jan. 31, 1979 [IL] Israel .................................. 56550

[51] Int. Cl.$^3$ ...................... F16K 17/32; F16K 17/22
[52] U.S. Cl. .................................. 137/469; 137/489; 137/510; 137/494
[58] Field of Search ................. 137/469, 489, 50, 495; 251/28

[56] References Cited

U.S. PATENT DOCUMENTS

| 836,306 | 11/1906 | Cunning | 137/489 |
| 1,098,616 | 6/1914 | Creveling | 137/489 |
| 2,387,364 | 10/1945 | Terry | 137/469 |
| 2,609,832 | 9/1952 | Smith | 137/489 |
| 2,920,690 | 1/1960 | Wright | 137/489 |
| 3,521,850 | 7/1970 | German | 251/28 |

FOREIGN PATENT DOCUMENTS

| 16248 | of 1929 | Australia | 137/489 |
| 113021 | 5/1941 | Australia | 137/489 |

Primary Examiner—Martin P. Schwadron
Assistant Examiner—G. L. Walton
Attorney, Agent, or Firm—Benjamin J. Barish

[57] ABSTRACT

A differential-pressure valve is described including a valve passageway formed through a fixed wall and closable by a valve member displaceable by a differential-pressure sensor biassed to close the valve passageway and subjected to the differential pressure such that the higher pressure tends to open the valve passageway and the lower pressure tends to close the valve passageway. The valve further includes an annular sealing surface between the sensor and the fixed wall through which the valve passageway is formed, which sealing surface circumscribes the valve passageway such that when the sensor is in its closed position, the annular sealing surface seals off a portion of the high-pressure face of the sensor from the high-pressure thereby increasing the differential pressure required to actuate the sensor to open the valve passageway, and when the sensor is in its open position the annular sealing surface exposes said portion of the high-pressure face of the sensor to the high-pressure thereby decreasing the differential pressure required to actuate the sensor to close the valve passageway.

11 Claims, 1 Drawing Figure

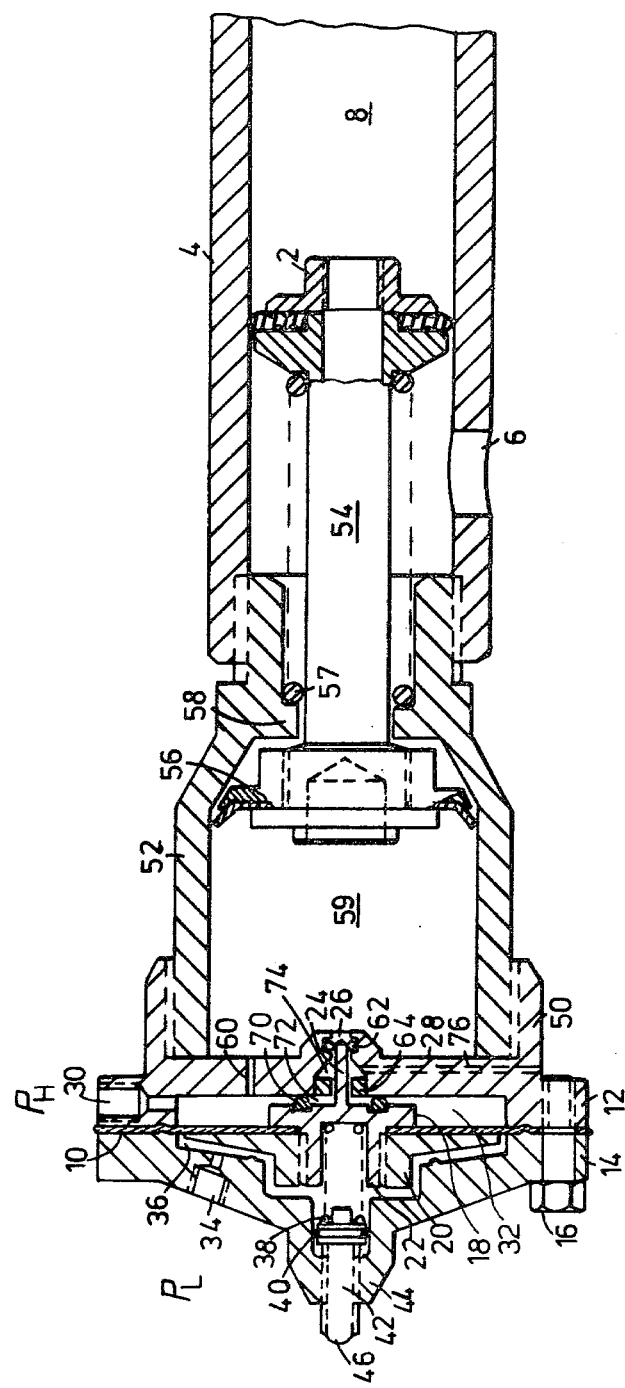

DIFFERENTIAL-PRESSURE VALVE

BACKGROUND OF THE INVENTION

The present invention relates to a differential-pressure valve, and also to a valve system including a controlled device, such as a main valve, controlled by the differential-pressure valve.

There are many applications in which differential-pressure valves are used to control other devices, such as main valves, in accordance with the difference in pressure at two locations of the device. One such application which may be mentioned for purposes of example is in backwashable filtering devices which are automatically actuated to backwash the filter whenever a predetermined quantity of dirt has accumulated on the filter. In such an application, the backwashing operation is automatically initiated by sensing the difference in the pressure at points upstream and downstream of the filter body, and when the pressure differential reaches a predetermined level, a valve is opened to initiate the backwashing of the filter. As the filter body is thus cleaned during the backwashing operation, the pressure-drop across it becomes lower thereby lowering the differential pressure; this is also sensed by the sensor which terminates the backwashing operation by closing the valve when the differential pressure reaches a predetermined minimum value. Examples of such backwashable filtering devices are described in my prior patent applications Ser. No. 74,525, filed Sept. 11, 1979, and Ser. No. 92,583, filed Nov. 8, 1979.

Such differential-pressure valves commonly include a valve passageway formed through a fixed wall and closable by a valve member displaceable by a differential-pressure sensor biassed to close the valve passageway and subjected to the differential pressure such that the higher pressure tends to open the valve passageway and the lower pressure tends to close the valve passageway.

An object of the present invention is to provide a differential-pressure valve of the above type but including an improved construction having a number of advantages as will be described more particularly below.

BRIEF SUMMARY OF THE INVENTION

According to a broad aspect of the present invention, there is provided a differential-pressure valve of the foregoing type, characterized in that the valve further includes an annular sealing surface between the sensor and the fixed wall through which the valve passage is formed, which sealing surface circumscribes the valve passageway. Further, the high-pressure face of the sensor has fixed thereto the valve member movable to open and close the passageway, and has also fixed thereto the mentioned annular sealing surface circumscribing the valve member. The arrangement is such that when the sensor is in its valve-closed position, the annular sealing surface seals off a portion of the high-pressure face of the sensor from the high-pressure thereby increasing the differential pressure required to actuate the sensor to open the valve passageway, and when the sensor is in its valve-open position the annular sealing surface exposes said portion of the high-pressure face of the sensor to the high-pressure thereby decreasing the differential pressure required to actuate the sensor to close the valve passageway.

The above features impart a quick-action, bistable-operation to the valve, in that the valve member is stably held closed until the predetermined opening differential-pressure is reached at which time it starts to open, whereupon the annular sealing surface is broken thereby increasing the cross-sectional area of the sensor subjected to the high pressure and causing the sensor to move with a quick action to its open position.

Another advantage in the above-described construction is that the differential pressure required to close the valve is less than that required to open the valve. This is highly desirable in many applications of differential-pressure valves. For example, in the above-mentioned application wherein the differential-pressure valve is used to effect a backwashing of the filter body, it is desirable to initiate the backwashing operation when a predetermined pressure differential has been reached (e.g., 0.5 atmosphere) and to continue the backwashing operation until a smaller pressure differential (e.g., 0.1 atmosphere) has been reached to assure that the filter body is substantially clean before the backwashing operation is terminated. This operation is inherent in the differential-pressure valve of the present invention since the high-pressure face of the sensor is of larger cross-sectional area when the valve is open then when the valve is closed, thereby requiring a lower pressure differential to close the valve than to open it.

According to another aspect of the invention, there is provided fluid-pressure controlled apparatus including a differential-pressure valve as described above, and a device controlled thereby, the controlled device including a cylinder having a piston movable therein to define a pressurized chamber, said valve passageway of the differential-pressure valve being connected to the pressurized chamber for controlling the pressure therein.

In the preferred embodiment of the invention described below, the controlled device is a main valve including a second piston movable in a second cylinder whose wall is formed with the main valve passageway, the second piston being of smaller cross-sectional area than the first-mentioned piston and being biassed to the closed position of the main valve by a spring. Such a construction is particularly useful in the automatically-back-washable filters mentioned above, since it assures that the main valve passageway, which is opened to effect the backwashing operation, will remain closed until the pressure within the line in which the filter is used builds up to the normal operating pressure. Such an arrangement obviates the need for separate pressure-regulators, or other devices, which are commonly included in the existing arrangements to assure that the main valve, which is opened by the pressure differential to initiate the backwashing operation, remains closed until the line has come up to the operating pressure, e.g., when initially filling the line.

Further features and advantages of the invention will be apparent from the description below.

DESCRIPTION OF PREFERRED EMBODIMENT

The invention is herein described, by way of example only, with reference to the accompanying single drawing FIGURE which is a longitudinal sectional view through a valve device including a differential-pressure valve constructed in accordance with the present invention.

The valve device illustrated in the accompanying drawing is for use in displacing a piston 2 movable within a cylinder 4 for opening or closing a valve passageway 6 in accordance with the difference in pressure between a high-pressure source $P_H$ and a low pressure source $P_L$.

One application for such a device, as mentioned above, is in a backwashable filter such as described in my above-cited prior patent applications, wherein piston 2 is subjected to the pressure in chamber 8 at the upstream side of the filter body so as to move (leftwardly in the drawing) to uncover opening 6, and thereby to permit the filter to be backflushed through opening 6. In such an application, the high pressure source $P_H$ is that at the upstream side of the filter body, and the low pressure source $P_L$ is that at the downstream side of the filter body. Thus, when the filter body is relatively clean, there will be a small pressure-drop through it, so that the pressure differential $P_H-P_L$ will be very small, insufficient to actuate valve member 2 to open passageway 6. However, as the dirt accumulates on the filter body, the pressure differential $P_H-P_L$ increases, such that when a predetermined pressure differential is reached, valve member 2 is actuated to uncover passageway 6 and thereby to initiate the backwashing operation.

The differential-pressure sensor which automatically controls the actuation of valve member 2 includes a diaphragm 10 of circular shape mounted between a pair of housing sections 12 and 14 secured together by bolts 16. The sensor further includes a circular rigid disc 18 secured within a central opening formed through the diaphragm 10 by means of a plastic cap 20 threaded onto exterior threads formed on stem 22 of the circular disc. The circular disc 18 carries a rod-shaped valve member 24 movable in or out of a control valve opening or passageway 26 formed in an end wall 28 integral with housing section 12.

The high pressure source $P_H$ is inletted, via port 30 formed in housing section 12, into a high-pressure chamber 32 at one side of the sensor diaphragm 10 such that the high-pressure $P_H$ tends to move valve member 24 carried by the diaphragm to open valve passageway 26. The low-pressure source $P_L$ is inletted, via port 34 formed in housing section 14, into a low-pressure chamber 36 at the opposite side of the sensor diaphragm 10 such that the low-pressure tends to move valve member 24 carried by the diaphragm to close the valve passageway 26.

In addition, a coil spring 38 is provided to bias the sensor diaphragm 10 to the closed position of its valve member 24 with respect to valve passageway 26. More particularly, spring 38 is received within a cavity formed centrally of stem 22 of the circular disc 18 and bears against a piston 40 having a stem 42 threadedly received within an opening in end wall 44 of housing section 14. Stem 42 includes a rotatable external knob 46 permitting piston 42 to be displaced inwardly or outwardly to preset the force applied by spring 38 against the sensor diaphragm 10, and thereby to preset the operating points of the valve.

End wall 28 formed in housing section 12 includes an annular flange 50 threadedly received on housing section 52. The latter housing section is in turn threadedly received within the previously-mentioned housing section 4 containing the main valve member 2 and the main valve passageway 6.

As mentioned above, the main valve member 2 is in the form of a piston movable within housing section 4, serving as a cylinder. Piston 2 is connected by a stem 54 to another piston 56 movable within housing section 52, which also serves as a cylinder. A spring 57, interposed between piston 2 and an internal shoulder 58 formed on housing section 52, urges piston 2, and thereby piston 56, in the direction (rightwardly in the drawing) tending to decrease the volume of chamber 8.

End wall 28, through which is formed the control valve passageway 26, is common to the high-pressure chamber 32 of the differential-pressure sensor, and chamber 59 defined by the end wall and piston 56 movable within cylinder 52. Chamber 59 is connected to the high-pressure chamber 32 at the opposite side of end wall 28 by a small bore 60 formed through end wall 28, this bore (e.g., 1 mm) being considerably smaller in cross-sectional area than that of the control valve passageway 26 (e.g., 3 mm).

Valve passageway 26 is formed in a dished central part of end wall 28 and is lined with an O-ring 62 adapted to sealingly engage the rod-shaped valve member 24 when the latter is in its closed position. The movement of valve member 24 is guided by a guide ring 64 carried on the opposite face of end wall 28 and formed with an opening for guiding the movement of the valve member 24 but permitting some clearance with respect thereto; that is, the rod-shaped valve member 24 is not sealingly received within guide rod 64.

An O-ring 70 is received within a circular recess formed on the inner face (i.e., the face exposed to the high-pressure chamber 32) of the circular disc 18. O-ring 70 is of larger diameter than, and circumscribes, both the guide ring 64 carried by the end wall 28, and the valve passageway 26 formed through the dished portion of the end wall.

The arrangement is such that when the sensor diaphragm 10 is in the valve-closed position as shown in the drawing (i.e., with its valve member 24 received within valve passageway 26), the O-ring 70 forms an annular sealing surface between the sensor diaphragm 10 and end wall 28. This seals off that portion 72 of the high-pressure face of the diaphragm sensor 10, enclosed by O-ring 70, from the high-pressure within chamber 32, thereby increasing the differential pressure $(P_H-P_L)$ required to actuate the sensor diaphragm 10 to move its valve member 24 out of the valve passageway 26 to open the valve. On the other hand, when the sensor diaphragm 10 is in the valve-open position, this portion 72 of the high-pressure face of the sensor diaphragm is exposed to the high-pressure in chamber 32, thereby decreasing the differential pressure required to move the diaphragm to its closed position. The foregoing will be better understood from the description below of the operation of the device.

Space 72 within the O-ring 70 communicates, via the above-mentioned clearance between the guide ring 64 and the valve member 24, with a space 74 on the opposite side of the guide ring. The latter space is in turn vented to the atmosphere via a bore 76 formed radially through end wall 28.

The device illustrated in the drawings may be used in the following manner for opening or closing valve passageway 26 in response to a predetermined difference in pressure between the high pressure source $P_H$ and the low pressure source $P_L$.

First, the differential-pressure for opening the valve passageway 26 may be preset by rotating the external knob 46 which adjusts the position of piston 40, and thereby the force spring 38 exerts against the sensor diaphragm 10 towards the closing position of valve member 24. However, as mentioned above and as to be described more particularly below, the differential-pressure $P_H-P_L$ for opening the valve will be significantly higher than that for closing the valve because of the presence of the annular sealing surface by the O-ring 70 when the sensor diaphragm is in its closed position.

Next, the high-pressure source $P_H$ is connected to inlet 30 whereby chamber 32 on one side of the sensor diaphragm 10 will be pressurized to that of the high-pressure source $P_H$; and the low-pressure source $P_L$ is connected to port 34 whereupon chamber 36 on the opposite side of the sensor diaphragm will be pressurized to that of the low-pressure source $P_L$.

Assuming that the sensor diaphragm 10 is in the illustrated valve-closed position, it will be seen that O-ring 70 will engage the confronting face of end wall 28, thereby sealing the surface area of the sensor diaphragm 10 within space 72 enclosed by the O-ring from the high-pressure of chamber 32. This reduces the force applied by the high-pressure chamber 32 to that side of the diaphragm tending to move it to the valve-open position. Accordingly, the pressure within the low-pressure chamber 36 will have to drop substantially before the pressure difference between the two pressure sources $P_H$ and $P_L$ will be sufficient to cause the sensor diaphragm 10 to move (leftwardly) to displace its valve member 24 out of the valve passageway 26, thereby opening the valve. However, as soon as the diaphragm has started to move in the valve-opening direction, the O-ring 70 moves with it away from the face of end wall 28. This exposes an enlarged surface area (i.e. enlarged by the area within the O-ring) of the face of the sensor diaphragm subjected to the high-pressure of chamber 32, whereupon the enlarged force effects a fast acting opening of the valve member 24 with respect to the valve passageway 26.

When the illustrated device is used for controlling the backwashing of a filter (in the application briefly mentioned above), the high-pressure source $P_H$ would be connected to a point upstream side of the filter body, and the low-pressure source $P_L$ would be connected to a point downstream of the filter body. Thus, the pressure differential applied to the sensor diaphragm 10 would be a measure of the quantity of dirt accumulated on the filter body, the pressure differential being high when the quantity of dirt is large and low when the quantity of dirt is small. When the sensor diaphragm 10 is in its closed position with its valve member 24 closing the valve passageway 26, the high-pressure in chamber 32 is transmitted via bore 60 into chamber 59, thereby pressurizing that chamber and causing piston 56 to move rightwardly, whereby piston 2 would be in the illustrated closed position with respect to the main valve passageway 6.

It may be noted in this connection that whereas the high-pressure upstream of the filter body is also applied to piston 2 in chamber 8, tending to move the piston leftwardly to open the main valve passageway 6, the surface area of piston 56 is larger than that of piston 2 so that a greater force is applied against piston 56 moving it to the illustrated position wherein piston 2 closes the main valve passageway 6.

Now, as dirt accumulates on the filter body, the pressure within the high-pressure chamber 32 remains constant, but that within the low-pressure chamber 36 drops, until the pressure differential between the two chambers, as applied to the sensor diaphragm 10, moves the diaphragm leftwardly as described above, causing it to withdraw its valve member 24 from valve passageway 26. This releases the pressure within chamber 59 via passageway 26 and bore 48, causing the high-pressure in chamber 8 to move piston 2 leftwardly to uncover the main valve passageway 6 which initiates the backwashing operation, the dirty water being flushed out through passageway 6.

As the filter body is cleaned during the backwashing operation, the low pressure $P_L$ downstream of the main filter body increases, thereby reducing the pressure differential between $P_L$ and $P_H$. However, since the high-pressure face of the sensor diaphragm 10 is now subjected to the high-pressure over its complete face, including that within the O-ring 70 as described above, the diaphragm will remain in its open position until the pressure within chamber 36 builds up to the point wherein the force applied by it to the sensor diaphragm 10, in combination with the force applied by spring 38, overcomes the enhanced force applied in the opposite direction to the diaphragm by the pressure within the high-pressure chamber 32. When this occurs, the sensor diaphragm 10 moves (rightwardly) to bring its valve member 24 into valve passageway 26, thereby closing the latter passageway with respect to bore 76. The pressure within chamber 59 then builds up by the high-pressure applied thereto from chamber 32 via bore 70, until piston 56 is moved rightwardly, to cause piston 52 also to move rightwardly and to close the main valve passageway 6, thereby terminating the backwashing operation.

As diaphragm 10 is displaced during the closing operation, its O-ring 70 again engages the face of end wall 28, thereby again sealing the space 72 within the O-ring from the high-pressure of chamber 32. This reduces the area of the face of diaphragm 10 subjected to the high-pressure in chamber 32, thereby reducing the force applied by this high pressure to the diaphragm opposing the closing force applied by the low-pressure vhamber 36. A quick and positive closing action of the valve member 24 is thus produced during the final closing movement of valve member 24.

As one example, the arrangement may be such that valve member 24 opens at a differential pressure of about 0.5 atmosphere and closes at a differential-pressure of about 0.1 atmosphere to assure that the filter body will be substantially clean before the backwashing operation is terminated. The above opening and closing operating points of the sensor may be pre-fixed by suitably selecting the diameter of the O-ring 70 (which determines the proportion of the high-pressure face of diaphragm 10 is made ineffective when the valve member is closed), and by adjusting knob 46 (which determines the force applied by spring 38 against the diaphragm).

Another advantage in the device illustrated, particularly when used for controlling the backwashing operation of a filter, resides in the provision of spring 57 and the relative dimensions of the two pistons 8 and 56. These features assure that until the pressure $P_H$ (namely, the line inlet pressure or the pressure upstream of the filter body) has built up to the normal operating pressure, piston 2 will be in the illustrated closed position with respect to the main valve passageway 6 so as to prevent the initiation of the backwashing operation until the pressure within the line has built up to the operating pressure, at which time the differential-pressure sensor, which opens or closes the valve passageway 26, will control the initiation and the termination of the backwashing operation as described above. This arrangement thus avoids the sensitivity of the system to the line pressure and obviates the need for a separate pressure regulator or other device for maintaining the main valve member 2 in its closed position with respect to passageway 6 (e.g., during filling of the line) until the line pressure has built up to its operating level.

While the invention has been described with respect to one preferred embodiment, it will be appreciated that many variations and other applications of the invention may be made. For example, O-ring 70 may be mounted on end wall 48, rather than on the sensor diaphragm 10, in which case the annular sealing surface circumscribing the control member 24 would be the face of the circular disc 18 of the diaphragm 10 engaged by the O-ring in the valve-closed position of the diaphragm. Further, the differential-pressure sensor could be of the piston type, rather than of the diaphragm type. Also, spring 57 could be applied between the end wall 48 and piston 56 rather than in the position illustrated. In addition, the differential-pressure sensor could also be used for controlling many other types of valves or fluid devices. Many other variations, modifications and applications of the illustrated embodiment will be apparent.

What is claimed is:

1. A differential-line pressure valve including a valve passageway formed through a fixed wall and closable by a valve member displaceable by a differential-line pressure sensor biased to close the valve passageway and having its opposite faces subjected to the differential-line pressure such that the higher pressure applied to one face of the sensor tends to open the valve passageway and the lower pressure applied to the opposite face of the sensor tends to close the valve passageway, characterized in that the high-pressure face of the sensor has fixed thereto the valve member movable to open and close said passageway, and also has fixed thereto an annular sealing surface circumscribing the valve member, such that when the sensor is in its valve-closed position, the annular sealing surface seals off the portion of the high-pressure face of the sensor circumscribing said valve member from the high-pressure thereby increasing the differential-line pressure required to actuate the sensor to open the valve passageway, and when the sensor is in its valve-open position the annular sealing surface exposes said portion of the high-pressure face of the sensor to the high-pressure thereby decreasing the differential-line pressure required to actuate the sensor to close the valve passageway.

2. A valve according to claim 1, wherein said valve member is of rod-shape and is movable into an out of the valve passageway for closing and opening same, said fixed wall including a guide element formed with a guide opening aligned with the valve passageway for guiding the valve member in its movements with respect to the valve passageway, the guide opening providing a clearance between it and the valve member, and the space between the guide element and the valve passageway being connected to the atmosphere via a venting passageway for venting to the atmosphere the fluid within the space circumscribed by said annular sealing surface during the closing of the valve passageway.

3. A valve according to claim 1, wherein said differential-line pressure sensor includes a diaphragm.

4. A valve according to claim 1, wherein said differential-line pressure sensor is biassed to close the valve passageway by a compression spring bearing against the low-pressure face of the sensor.

5. A valve according to claim 4, wherein said biassing spring is interposed between the low-pressure face of the sensor and a piston which is threaddedly received in an end wall of the valve for presetting the differential pressure effective to actuate the valve.

6. A valve according to claim 1, wherein said annular sealing surface is an O-ring carried by the high-pressure face of the sensor.

7. Fluid-pressure controlled apparatus including a differential-line pressure valve according to claim 1, and a device controlled thereby, said controlled device including a cylinder having a piston movable therein to define a pressurized chamber, said valve passageway of the differential-line pressure valve being connected to the pressurized chamber for controlling the pressure therein.

8. Apparatus according to claim 7, wherein said fixed wall of the differential-line pressure valve is common with the pressurized chamber of the controlled device and includes a connecting passageway therethrough of smaller cross-sectional area than the valve passageway for pressurizing said chamber of the controlled device when the valve passageway is closed.

9. Apparatus according to claim 8, wherein the controlled device is a main valve including a main valve member at the opposite end of said piston movable to open or close a main valve passageway.

10. Apparatus according to claim 9, wherein said main valve member is a second piston movable in a second cylinder formed through its wall with the main valve passageway.

11. Apparatus according to claim 10, wherein said second piston is of smaller cross-sectional area than said first-mentioned piston but is biassed to the closed position of the main valve by a spring.

* * * * *